Oct. 30, 1923.
H. M. NAUGLE ET AL
1,472,773
EXPANDED METAL MANUFACTURE
Filed July 27, 1922　　9 Sheets-Sheet 1
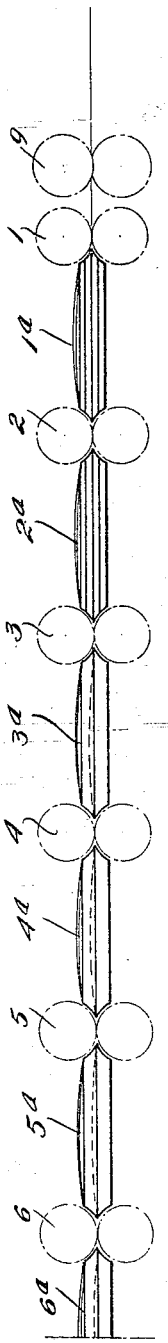
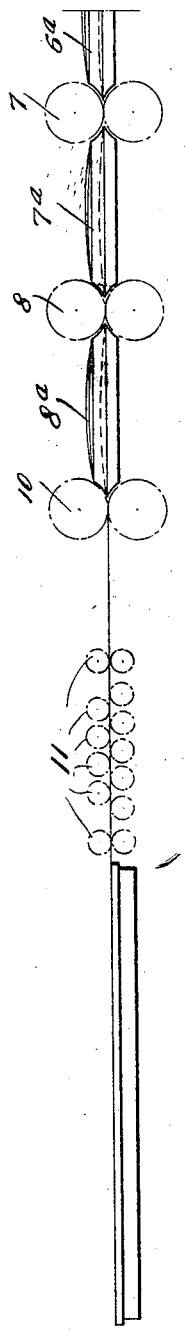
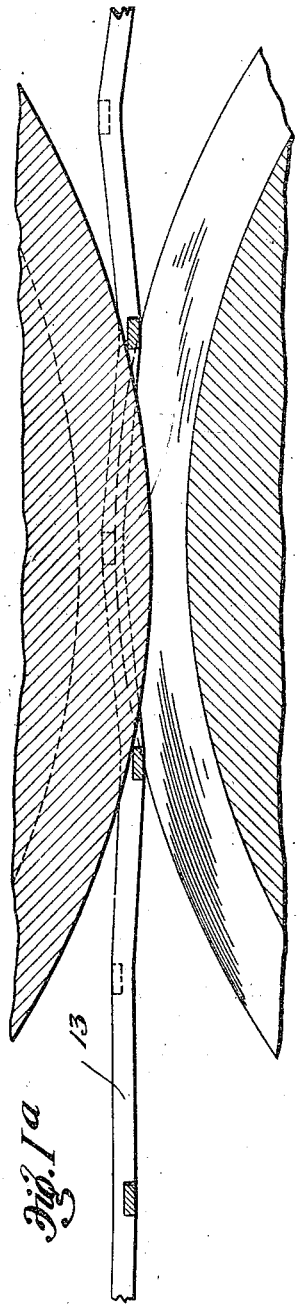
Inventor
H. M. Naugle and
A. J. Townsend
By Fresn and L Bond
Attorneys Oct. 30, 1923.
H. M. NAUGLE ET AL
EXPANDED METAL MANUFACTURE
Filed July 27, 1922
1,472,773
9 Sheets-Sheet 2
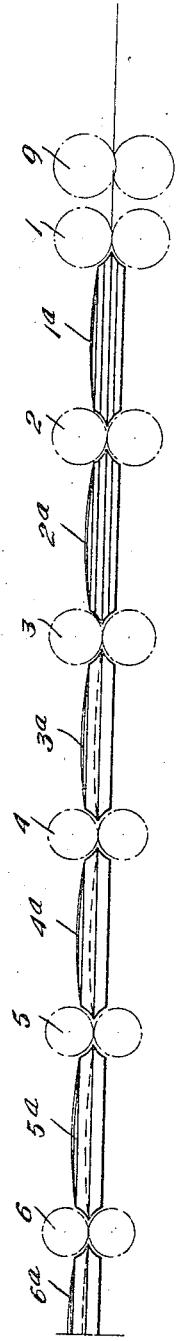
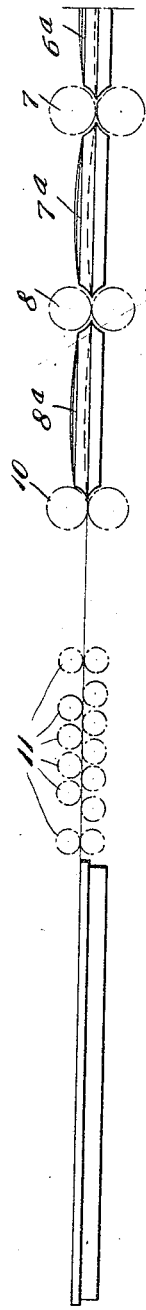
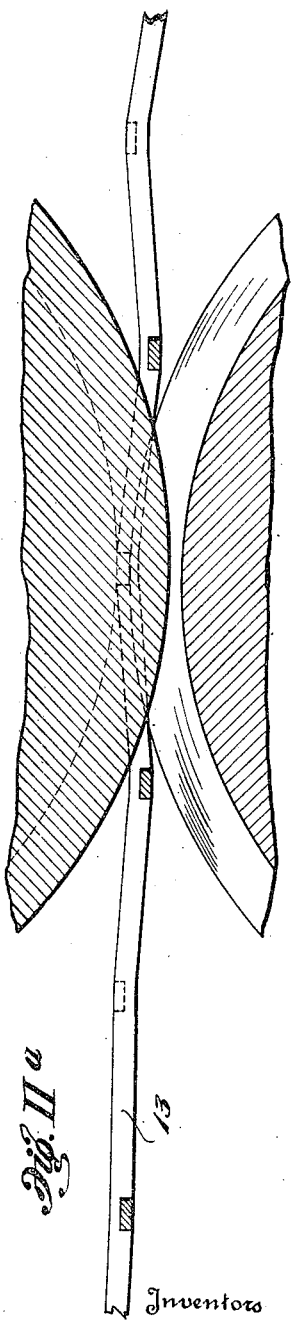
Fig. II
Fig. IIa
Inventors
H. M. Naugle and
A. J. Townsend
By Freast and Bond
Attorneys

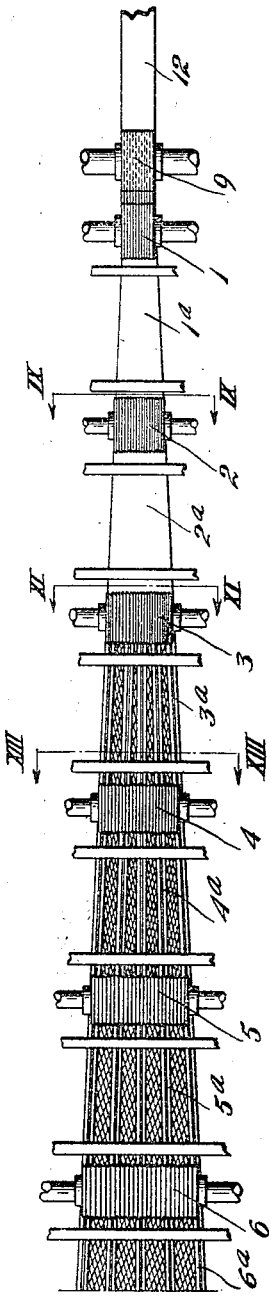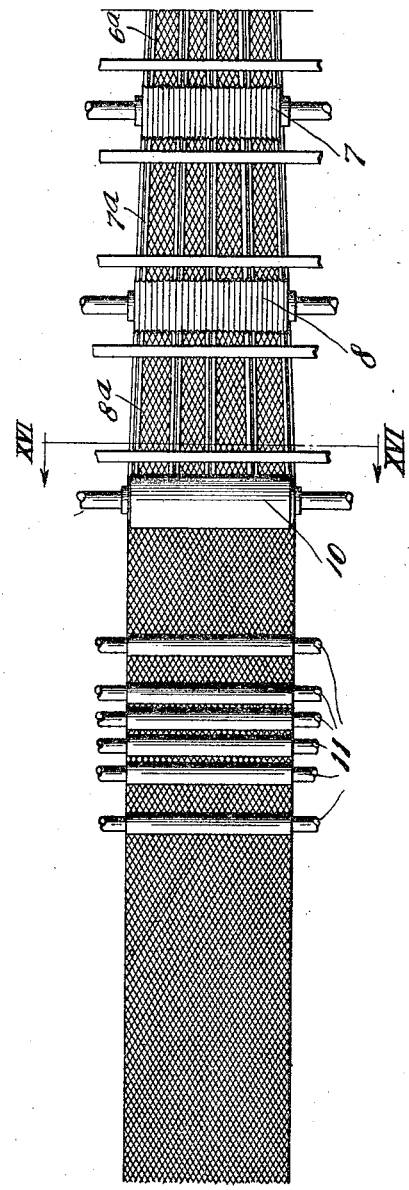

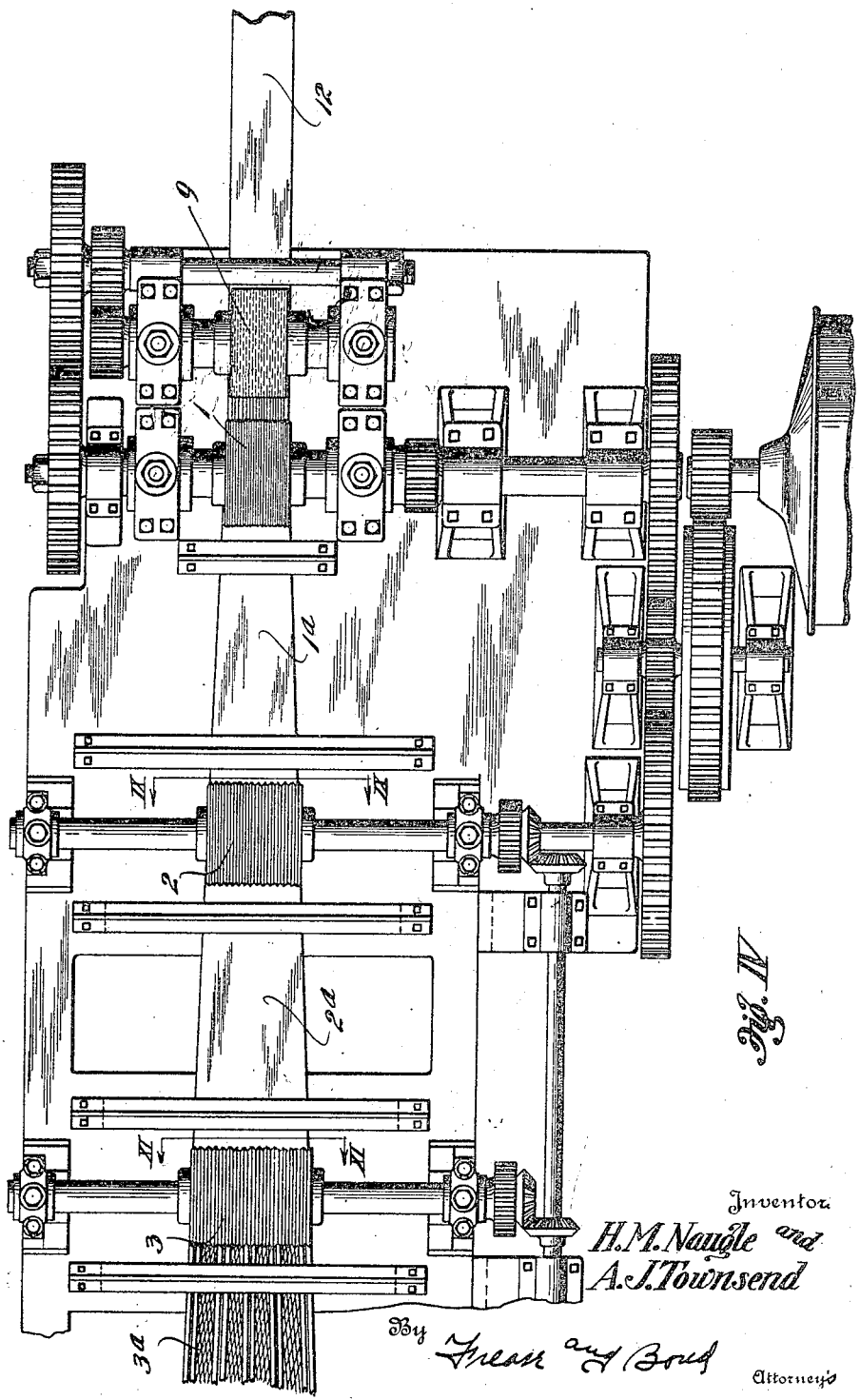

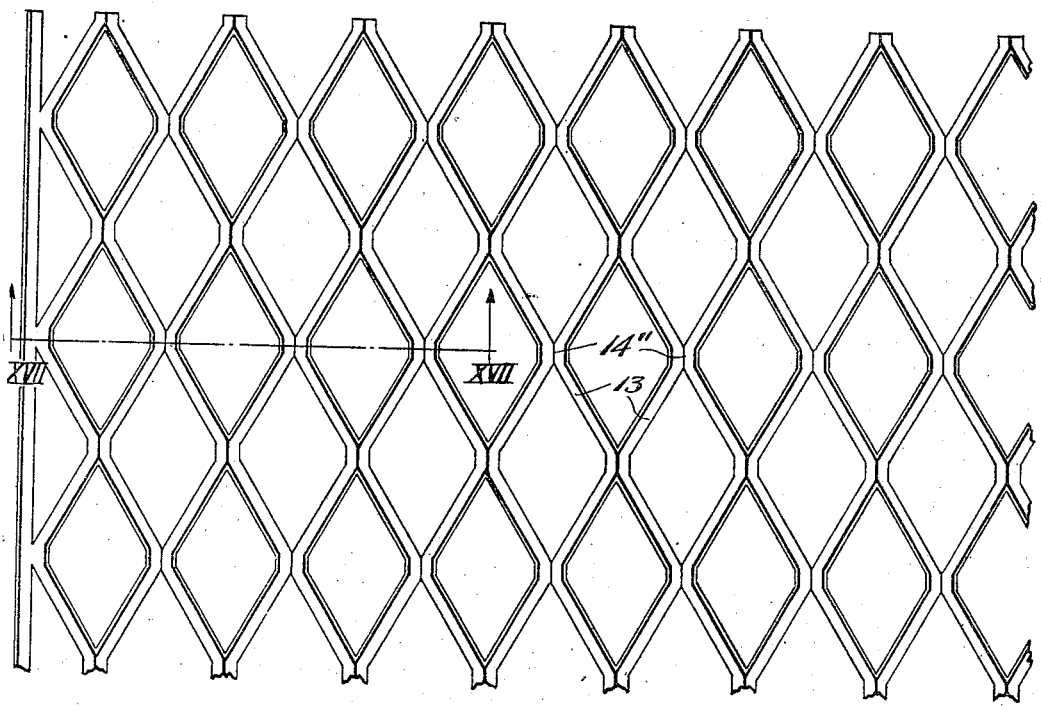
Fig. VI
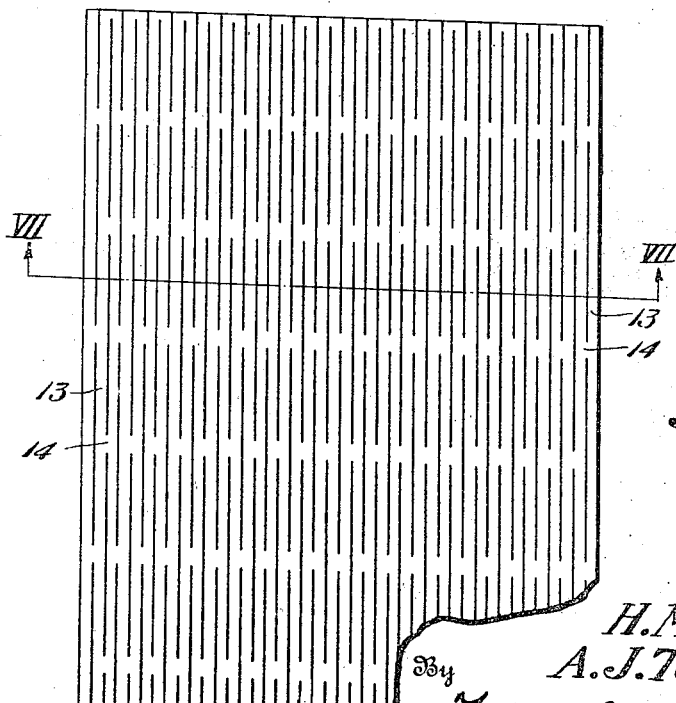
Fig. V

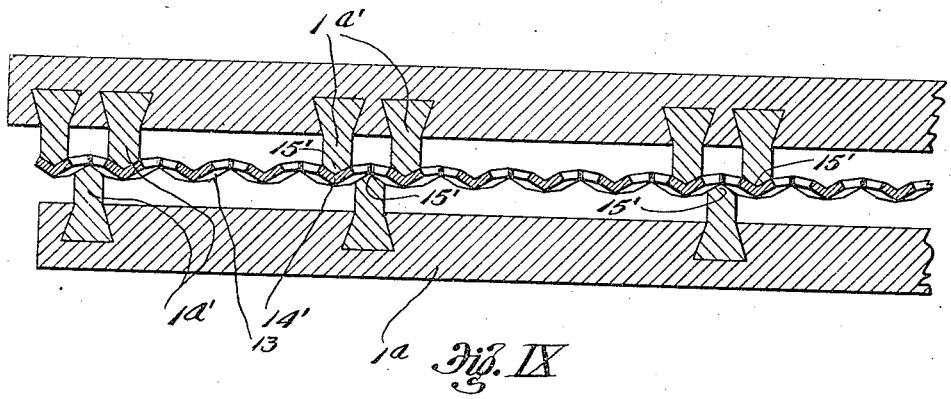
Fig. IX
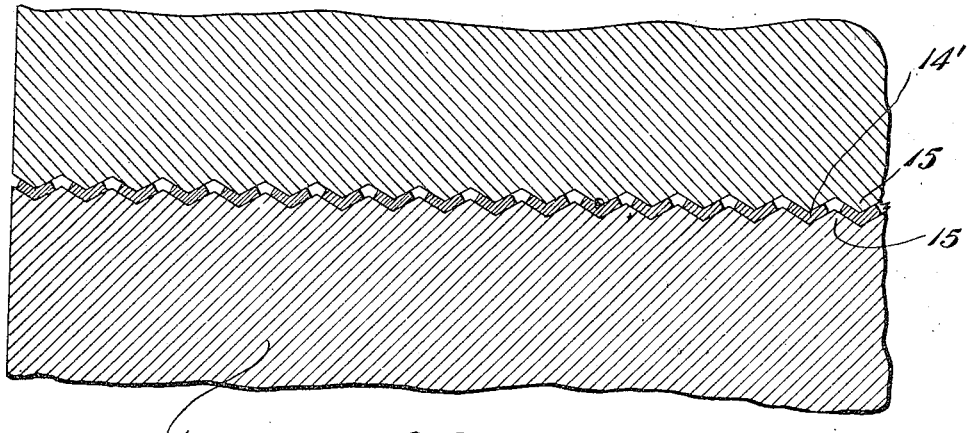
Fig. VIII
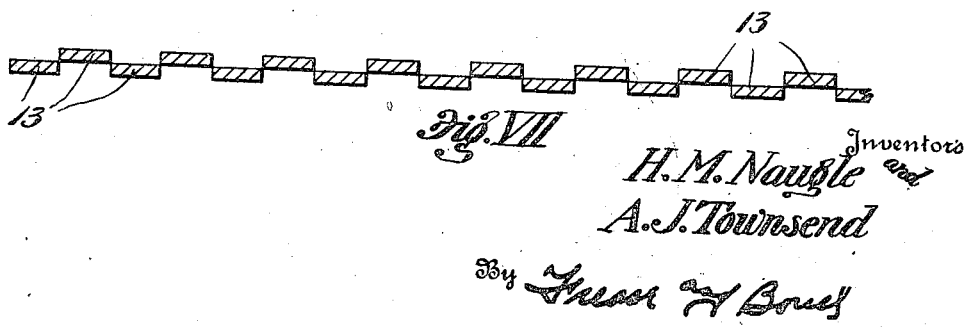
Fig. VII

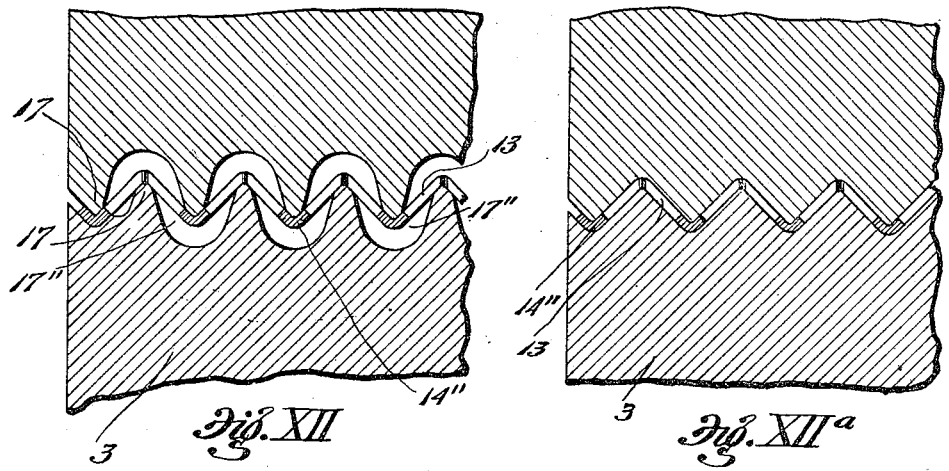
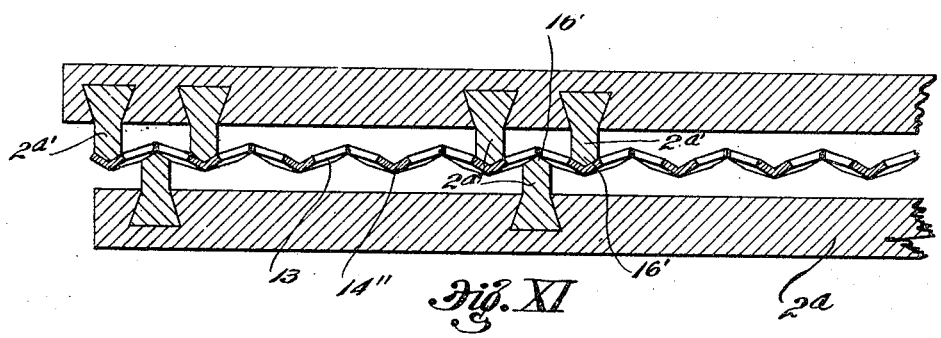
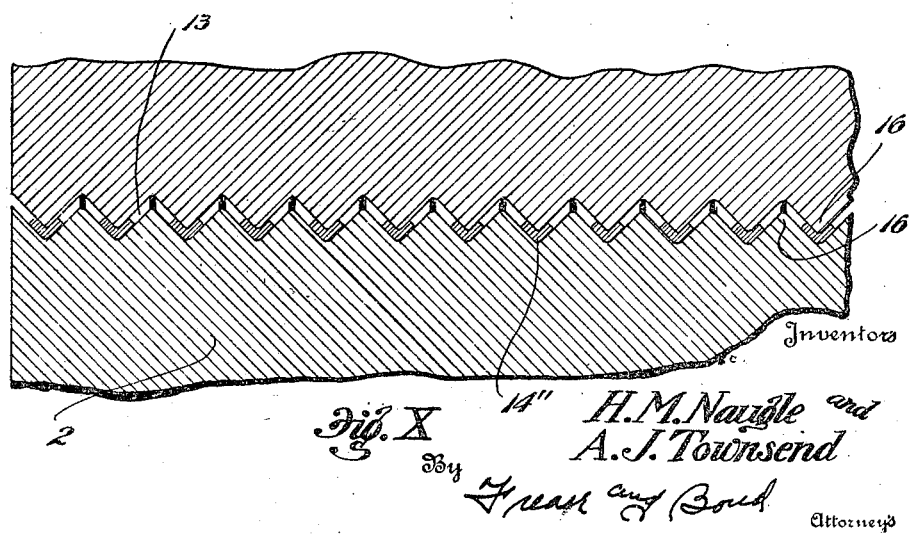

Oct. 30, 1923.
H. M. NAUGLE ET AL
1,472,773
EXPANDED METAL MANUFACTURE
Filed July 27, 1922
9 Sheets-Sheet 8
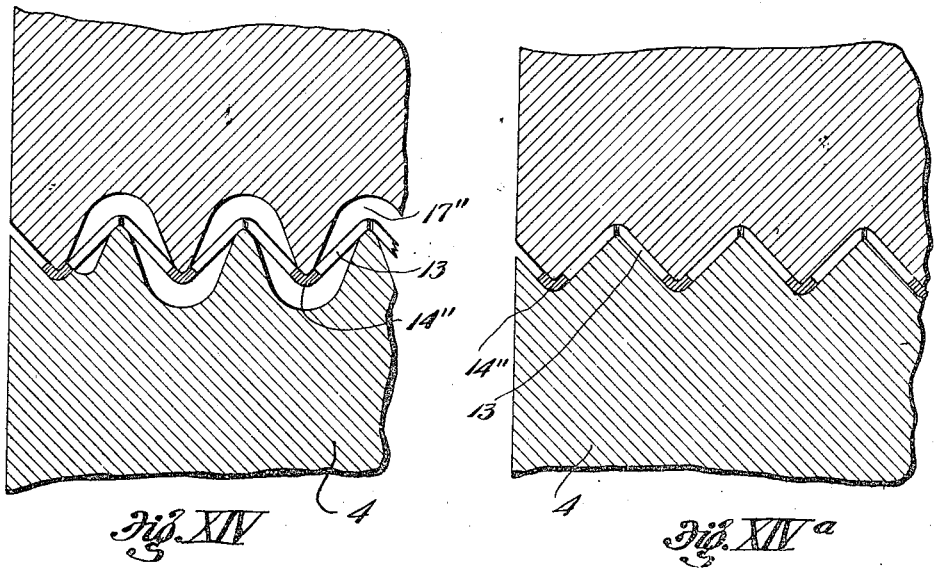
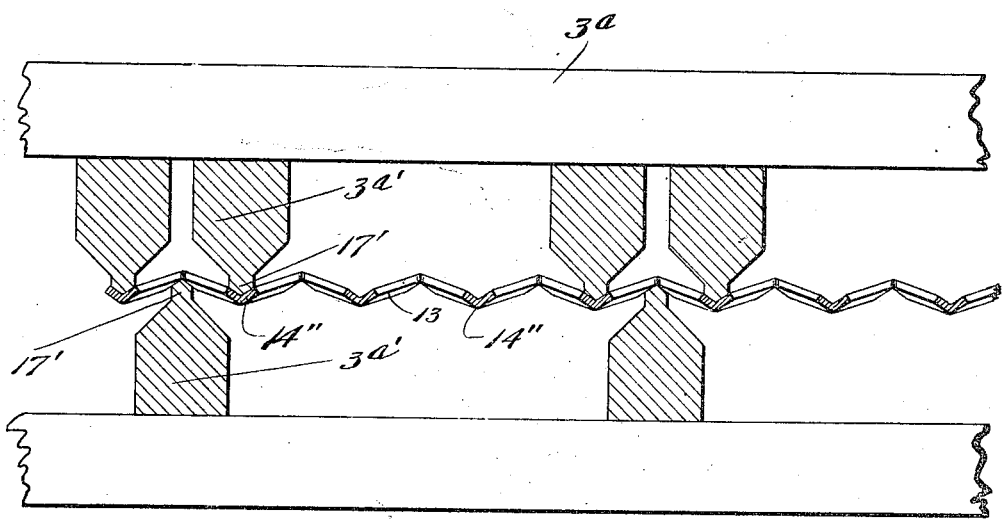
Inventors
H. M. Naugle and
A. J. Townsend

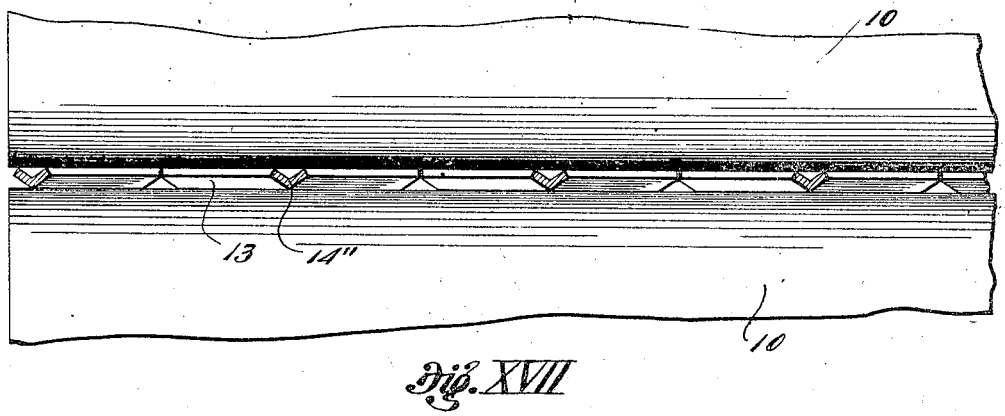
Fig. XVII
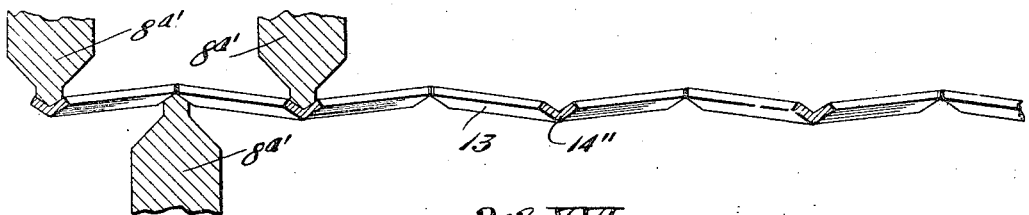
Fig. XVI
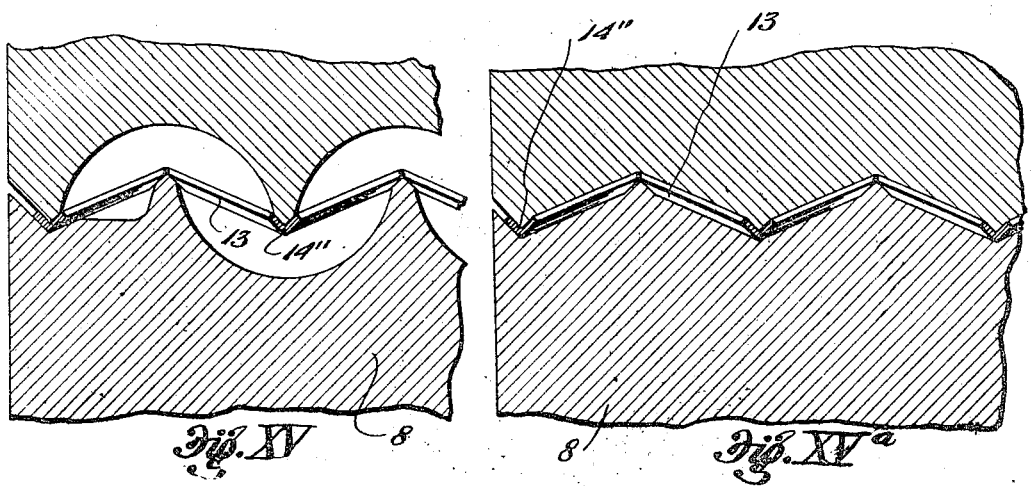
Fig. XV
Fig. XV<sup>a</sup>
Inventors
H. M. Naugle and
A. J. Townsend
By Frese and Bond
Attorneys Patented Oct. 30, 1923.

1,472,773

UNITED STATES PATENT OFFICE.

HARRY M. NAUGLE AND ARTHUR J. TOWNSEND, OF CANTON, OHIO.

EXPANDED-METAL MANUFACTURE.

Application filed July 27, 1922. Serial No. 577,831.

*To all whom it may concern:*

Be it known that we, HARRY M. NAUGLE and ARTHUR J. TOWNSEND, citizens of the United States, residing at Canton, in the county of Stark and State of Ohio, have invented a new and useful Improvement in Expanded-Metal Manufacture, of which the following is a specification.

The invention relates to methods and apparatus for expanding metal sheets or strips of the thicker gauges for making road mesh or the like; and the objects of the improvement is to provide a continuous method and apparatus for producing an expanded mesh with the adjacent bonds reversely corrugated, and with the connecting bars either stretched or merely bent, as may be desired.

Road mesh need not be provided with longitudinal beads or ribs, which if present in a sheet could be engaged by guides for expanding the mesh; and the present improvement involves a reverse corrugation of alternate rows of bonds, and the engagement of certain rows of bonds by diverging guides for separating the bonds to form the mesh.

Apparatus which may be employed for expanding road mesh by the new method, is illustrated in the accompanying drawings, forming part hereof, in which—

Figure I is a diagrammatic side elevation, in two sections, of the improved apparatus, showing rolls of equal diameter;

Fig. I$^a$, a fragmentary section, showing the stretching action of corrugating rolls of relatively large diameter;

Fig. II, a diagrammatic side elevation in two sections, of modified apparatus, showing corrugating rolls of differential diameters;

Fig. II$^a$, a fragmentary section showing the action of corrugating rolls of relatively small diameter;

Fig. III, a diagrammatic plan of the improved apparatus, showing corrugating rolls of equal diameter;

Fig. IV, a plan view of the slitting rolls and the first three corrugating rolls, showing a preferred gearing between the slitting and the corrugating rolls;

Fig. V, a fragmentary plan of a sheet slit for expanding;

Fig. VI, a fragmentary plan of a sheet showing the mesh expanded and flattened;

Fig. VII, a section of a slitted sheet, on line VII—VII, Fig. V;

Fig. VIII, a fragmentary section showing the shape and action of the first corrugating rolls;

Fig. IX, a fragmentary section on line IX—IX, Figs. III and IV, at the rear ends of the first guides, showing the initial separation of the corrugated bonds;

Fig. X, a fragmentary section showing the shape and action of the second corrugating rolls;

Fig. XI, a fragmentary section on line XI—XI, Figs. III and IV, at the rear end of the second guides, showing a further separation of the corrugated bonds;

Fig. XII, a fragmentary section showing the shape and action of the third corrugating roll, as when used for stretching the bars of a mesh;

Fig. XII$^a$, a fragmentary section showing a modified shape and action of the third corrugating rolls, as when not used for stretching the bars of a mesh;

Fig. XIII, a fragmentary section on line XIII—XIII, Fig. III, near the rear end of the third guides, showing a further separation of the bonds;

Fig. XIV, a fragmentary section showing the shape and action of the fourth corrugating rolls as when used for stretching the bars of a mesh;

Fig. XIV$^a$, a fragmentary section showing a modified shape and action of the fourth corrugating rolls, as when not used for stretching the bars of a mesh;

Fig. XV, a fragmentary section showing the shape and action of the eighth corrugating rolls, as when used for stretching the bars with a mesh;

Fig. XV$^a$, a fragmentary section showing a modified shape and action of the eighth corrugating rolls, as when not used for stretching the bars of a mesh;

Fig. XVI, a fragmentary section, as on line XVI—XVI, Fig. III, near the rear end of the eighth guides, showing the final separation of the bonds; and Fig. XVII, a fragmentary section showing the shape and action of the mesh flattening rolls, and showing the fully expanded and flattened mesh, on line XVII—XVII, Fig. VI.

The improved apparatus includes a series of eight sets, more or less, of corrugating rolls 1, 2, 3, 4, 5, 6, 7 and 8; and corresponding guides 1$^a$, 2$^a$, 3$^a$, 4$^a$, 5$^a$, 6$^a$, 7$^a$ and 8$^a$. In front of the first set of corrugating rolls may be located a set of slitting rolls 9, in rear of the last corrugating rolls may be located a set of flattening rolls 10, and in rear of the flattening rolls may be located a series of straightening rolls 11.

A strip or sheet of metal 12, of from seven to sixteen gauge, may be used for making road mesh, and the slitting rolls cut the same with parallel series of interrupted longitudinal slits in staggered relation, as shown in Fig. V, to form bars 13 and bonds 14; and the action of the slitting rolls may deflect alternate bars 13 to one side or the other of the plane of the bonds 14 between the slits.

The first or initial corrugating rolls 1 are shaped with series of annular V-shaped ribs or dies 15, which may form an angle of about 120°. These dies act upon the median lines of the bonds to corrugate them in reverse direction in alternate rows and to laterally incline adjacent bars in like manner; at the same time bringing the bars and bonds into true and uniform relation to each other, as shown for the corrugated bonds 14' in Fig. VIII. This operation slightly separates the bonds to the extent that they are corrugated without, however, increasing the width of the sheet.

The first guides 1ᵃ may be in the form of plates having longitudinal guide bars 1ᵃ' secured thereto and shaped with V-edges 15' corresponding to the corrugations formed by the first corrugating rolls; and as shown in Fig. IX, the guide bars may be arranged in spaced relation so as to engage certain ones only of the corrugated bonds of the sheet. The guide bars 1ᵃ gradually diverge laterally, from their forward to their rear ends, and serve to separate the bonds and to partly open the mesh.

The second guide rolls 2 are shaped similar to the first guide rolls, with series of annular V-shaped ribs or dies 16, which are preferably formed at an angle of about 90°, and act upon the initially separated bonds to increase the depth of the corrugation, and to sharpen the angle of the corrugations and to increase the inclination of the bars, as shown for the bonds 14'', in Fig. X.

The second guides 2ᵃ may also be in the form of plates having guide bars 2ᵃ' secured thereto and shaped with V-edges 16' corresponding to the corrugations formed by the second corrugating rolls; and as shown in Fig. XI, these guide bars may likewise be arranged in spaced relation so as to engage certain ones only of the corrugated bonds of the sheet, and are gradually diverged from front to rear, so as to further separate the bonds and further open the mesh.

The third corrugating rolls 3 are shaped with series of annular V-shaped flanges or dies 17, the edges of which may be formed at an angle of about 90°, and the rolls may be cut out to form clearance grooves 17'' between the flanges or dies, as shown in Fig. XII, or clearance grooves may be omitted as shown in Fig. XIIᵃ; depending upon the diameter of the rolls and the manner in which they act upon the sheet for expanding the mesh.

The third guides 3ᵃ may include cross bars with longitudinal guide bars 3ᵃ' secured thereto and shaped with V-edges 17' corresponding to the corrugations formed by the third corrugating rolls; and, as shown in Fig. XIII, these guide bars are arranged in spaced relation so as to engage certain ones only of the corrugated bonds of the sheet, and are gradually diverged from front to rear, so as to further separate the bonds and further open the mesh.

When corrugating rolls of large diameter are used, as compared to the longitudinal distance between successive bonds, so as to stretch the connecting bars, as indicated in Fig. 1ᵃ, it is preferred to provide the clearance groove 17'' so that the roll dies will not engage the bars, as shown in Fig. XII; but when the rolls are of relatively small diameter, as compared with the longitudinal distance between successive bonds, so as not to act upon the bonds to stretch the bars, the clearance grooves may be omitted in the corrugating rolls, as shown in XIIᵃ.

When rolls are employed which stretch the bars so as not to shorten the sheet during the expanding operation, the corrugating rolls are all of the same diameter, as shown in Fig. 1, and are operated at the same peripheral speed; but when corrugating rolls are used which do not stretch the strands, the peripheries of successive corrugating rolls are operated at differential reduced speed, either by gearing down rolls of equal diameter or by the use of rolls of gradually reduced differential diameters geared to operate at the same rate of rotation, as shown in Fig. 2.

The action of the corrugating rolls, and particularly the third and subsequent set of rolls, serve either to stretch the bars between bonds, or to bend them hinge-like at their connections with the bonds, depending upon the relation of the diameter of the rolls to the longitudinal distance between bonds, and the action of the third and subsequent guides is to further separate the bonds and further widen the mesh to the extent the bars have been stretched or bent by the next previous set of corrugating rolls.

The formation and action of the fourth corrugating rolls shown in Figs. XIV and XIVᵃ, is substantially duplicated for each successive set of corrugating rolls, except as to the lateral distance between dies which is gradually increased, until the maximum lateral interval is reached in the eighth set of corrugating rolls 8, as shown in Figs. XV and XVᵃ.

Likewise the third guides shown in Fig. XIII, are duplicated in the successive guides, excepting only that the lateral distance between the guide bars is increased to the eighth guide 8ª, wherein the maximum interval between guide bars 8ª' is reached, as shown in Fig. XVI.

The intermediate bars in each guide are longitudinally arched so as to equalize the length of the diverging bars, as shown in a general way in Figs. I and II; and when the full lateral expansion of the sheet has been made, as by the eighth set of rolls and guides, the flattening rolls 10 act upon the sheet to bring the corrugated bonds and inclined bars into the same plane, as shown in Fig. XVII, following which the straightening rolls 11 serve to smooth the expanded sheet in well known manner.

We claim:

1. The method of expanding metal sheets and the like cut with parallel rows of interrupted longitudinal slits in staggered relation to form bonds and bars, which consists in reversely corrugating alternate rows of bonds longitudinally and inclining adjacent rows of bars laterally, then guiding the corrugations of certain rows of bonds to laterally separate all the bonds and expand the mesh, and then deepening the corrugations and further expanding the mesh by a repetition of like operations.

2. The method of expanding metal sheets and the like cut with parallel rows of interrupted longitudinal slits in staggered relation to form bonds and bars, which consists in reversely corrugating alternate rows of bonds longitudinally and inclining adjacent rows of bars laterally, then guiding the corrugations of certain rows of bonds to laterally separate all the bonds and expand the mesh, and then deepening the corrugations to straight stretch the bars, and further diverging the bonds to expand the mesh, by a repetition of like operations.

3. The method of expanding metal sheets and the like cut with parallel rows of interrupted longitudinal slits in staggered relation to form bonds and bars, which consists in reversely corrugating alternating rows of bonds longitudinally and inclining adjacent rows of bars laterally, then guiding the corrugations of certain rows of bonds to laterally separate all the bonds and expand the mesh, and then deepening the corrugations and further expanding the mesh by a series of successive repetitions of like operations.

4. The method of expanding metal sheets and the like cut with parallel rows of interrupted longitudinal slits in staggered relation to form bonds and bars, which consists in reversely corrugating alternate rows of bonds longitudinally and inclining adjacent rows of bars laterally, then guiding the corrugations of certain rows of bonds to laterally separate all the bonds and expand the mesh, and then flattening the mesh to set the corrugated bonds and inclined bars in the same plane.

5. The method of expanding metal sheets and the like cut with parallel rows of interrupted longitudinal slits in staggered relation to form bonds and bars, which consists in reversely corrugating alternate rows of bonds longitudinally and inclining adjacent rows of bars laterally, then guiding the corrugations of certain rows of bonds to laterally separate all the bonds and expand the mesh, then flattening the mesh to set the corrugated bonds and inclined bars in the same plane, and then straightening the expanded and flattened sheet.

6. The method of expanding metal sheets and the like during a continuous longitudinal movement of the sheet, which consists in cutting parallel rows of interrupted longitudinal slits in staggered relation to form bonds and bars therein, then reversely corrugating alternate rows of bonds longitudinally and inclining adjacent rows of bars laterally, then guiding the corrugations of certain rows of bonds to laterally separate all the bonds and expand the mesh, and then deepening the corrugations and further expanding the mesh by a repetition of like operations.

7. The method of expanding metal sheets and the like during a continuous longitudinal movement of the sheet, which consists in cutting parallel rows of interrupted longitudinal slits in staggered relation to form bonds and bars therein, then reversely corrugating alternate rows of bonds longitudinally and inclining adjacent rows of bars laterally, then guiding the corrugations of certain rows of bonds to laterally separate all the bonds and expand the mesh, and then deepening the corrugations and further expanding the mesh by a series of successive repetitions of like operations.

8. The method of expanding metal sheets and the like cut with parallel rows of interrupted longitudinal slits in staggered relation to form bonds and bars, which consists in reversely corrugating alternate rows of bonds longitudinally and inclining adjacent rows of bars laterally, and then guiding the corrugations of certain rows of bonds to laterally separate all the bonds and expand the mesh.

9. Apparatus for expanding metal sheets and the like cut with parallel rows of interrupted longitudinal slits in staggered relation to form bonds and bars, including roller means reversely corrugating alternate rows of bonds longitudinally and inclining adjacent rows of bars laterally, guide means engaging the corrugations of certain rows of bonds and laterally separating all the bonds and expanding the mesh, roller means deepening the corrugations, and guide means further expanding the mesh.

10. Apparatus for expanding metal sheets and the like cut with parallel rows of interrupted longitudinal slits in staggered relation to form bonds and bars, including roller means reversely corrugating alternate rows of bonds longitudinally and inclining adjacent rows of bars laterally, guide means engaging the corrugations of certain rows of bonds and laterally separating all the bonds and expanding the mesh, roller means deepening the corrugations and stretching the bars, and guide means further expanding the mesh.

11. Apparatus for expanding metal sheets and the like cut with parallel rows of interrupted longitudinal slits in staggered relation to form bonds and bars, including roller means reversely corrugating alternate rows of bonds longitudinally and inclining adjacent rows of bars laterally, guide means engaging the corrugations of certain rows of bonds and laterally separating all the bonds and expanding the mesh, a series of roller means successively deepening the corrugations and corresponding guide means further expanding the mesh.

12. Apparatus for expanding metal sheets and the like cut with parallel rows of interrupted longitudinal slits in staggered relation to form bonds and bars, including roller means reversely corrugating alternate rows of bonds longitudinally and inclining adjacent rows of bars laterally, guide means engaging the corrugations of certain rows of bonds and laterally separating all the bonds and expanding the mesh, a series of roller means successively deepening the corrugations and stretching the bars, and guide means further expanding the mesh.

HARRY M. NAUGLE.
ARTHUR J. TOWNSEND.